(12) United States Patent
Kuo et al.

(10) Patent No.: US 12,379,556 B2
(45) Date of Patent: Aug. 5, 2025

(54) PACKAGE STRUCTURE HAVING GRATING COUPLER AND MANUFACTURING METHOD THEREOF

(71) Applicant: Taiwan Semiconductor Manufacturing Company, Ltd., Hsinchu (TW)

(72) Inventors: Feng-Wei Kuo, Hsinchu County (TW); Chewn-Pu Jou, Hsinchu (TW); Hsing-Kuo Hsia, Hsinchu County (TW); Chih-Wei Tseng, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/652,775

(22) Filed: May 1, 2024

(65) Prior Publication Data

US 2024/0280765 A1 Aug. 22, 2024

Related U.S. Application Data

(63) Continuation of application No. 17/896,089, filed on Aug. 26, 2022, now Pat. No. 12,007,611.

(51) Int. Cl.
*G02B 6/42* (2006.01)
*G02B 6/293* (2006.01)

(52) U.S. Cl.
CPC ....... *G02B 6/4215* (2013.01); *G02B 6/29328* (2013.01); *G02B 6/4206* (2013.01); *G02B 6/4274* (2013.01)

(58) Field of Classification Search
None
See application file for complete search history.

(56) References Cited

U.S. PATENT DOCUMENTS

| | | | |
|---|---|---|---|
| 7,480,429 B1 * | 1/2009 | Chiniwalla | G02B 6/124 |
| | | | 398/56 |
| 8,267,583 B2 * | 9/2012 | Yao | G02B 6/12002 |
| | | | 384/31 |
| 8,993,380 B2 | 3/2015 | Hou et al. | |
| 9,281,254 B2 | 3/2016 | Yu et al. | |
| 9,299,649 B2 | 3/2016 | Chiu et al. | |
| 9,372,206 B2 | 6/2016 | Wu et al. | |
| 9,425,126 B2 | 8/2016 | Kuo et al. | |
| 9,443,783 B2 | 9/2016 | Lin et al. | |
| 9,461,018 B1 | 10/2016 | Tsai et al. | |
| 9,496,189 B2 | 11/2016 | Yu et al. | |
| 9,666,502 B2 | 5/2017 | Chen et al. | |
| 9,715,064 B1 * | 7/2017 | Gambino | G02B 6/43 |
| 9,735,131 B2 | 8/2017 | Su et al. | |
| 10,243,322 B2 * | 3/2019 | Mahgerefteh | G02B 6/12004 |
| 11,036,014 B1 * | 6/2021 | Seyedi | G02B 6/34 |
| 11,417,596 B2 * | 8/2022 | Song | H01L 23/52 |

(Continued)

*Primary Examiner* — Jerry Rahll
(74) *Attorney, Agent, or Firm* — JCIPRNET

(57) ABSTRACT

A package structure comprises photonic dies and an interposer structure. Each photonic die includes a dielectric layer and a first grating coupler embedded in the dielectric layer. The interposer structure is disposed below the photonic dies. The interposer structure includes an oxide layer and a second grating coupler embedded in the oxide layer. The photonic dies are optically coupled through the first grating couplers of the photonic dies and the second grating coupler of the interposer structure.

20 Claims, 11 Drawing Sheets

(56) References Cited

U.S. PATENT DOCUMENTS

| | | | |
|---|---|---|---|
| 11,490,177 B1* | 11/2022 | Gallagher | H04B 10/25 |
| 2014/0010498 A1* | 1/2014 | Verslegers | G02B 6/26 |
| | | | 385/37 |
| 2014/0294342 A1* | 10/2014 | Offrein | G02B 6/4214 |
| | | | 385/14 |
| 2015/0063745 A1* | 3/2015 | Lin | H01L 23/60 |
| | | | 385/14 |
| 2015/0211960 A1* | 7/2015 | Shimizu | G02B 6/124 |
| | | | 356/73.1 |
| 2016/0238793 A1* | 8/2016 | Frankel | G02B 6/14 |
| 2017/0179680 A1* | 6/2017 | Mahgerefteh | H01S 5/12 |
| 2021/0193564 A1* | 6/2021 | Song | H01L 23/52 |
| 2023/0016616 A1* | 1/2023 | Gallagher | H04B 10/25 |

* cited by examiner

PACKAGE STRUCTURE HAVING GRATING COUPLER AND MANUFACTURING METHOD THEREOF

CROSS-REFERENCE TO RELATED APPLICATION

This application is a continuation application of and claims the priority benefit of a prior U.S. patent application Ser. No. 17/896,089, filed on Aug. 26, 2022. The entirety of the above-mentioned patent application is hereby incorporated by reference herein and made a part of this specification.

BACKGROUND

Electrical signaling and processing are one technique for signal transmission and processing. Optical signaling and processing have been used in increasingly more applications in recent years, particularly due to the use of optical fiber-related applications for signal transmission. Optical gratings are frequently used to enable communication between light sources and other components (e.g., photodetectors). As the demand for high-speed data transmission has grown, grating coupler efficiency is playing an increasingly more important role in the improvement of the performance of the integrated circuits. The grating coupler efficiency is one of the factors in the performance improvement.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
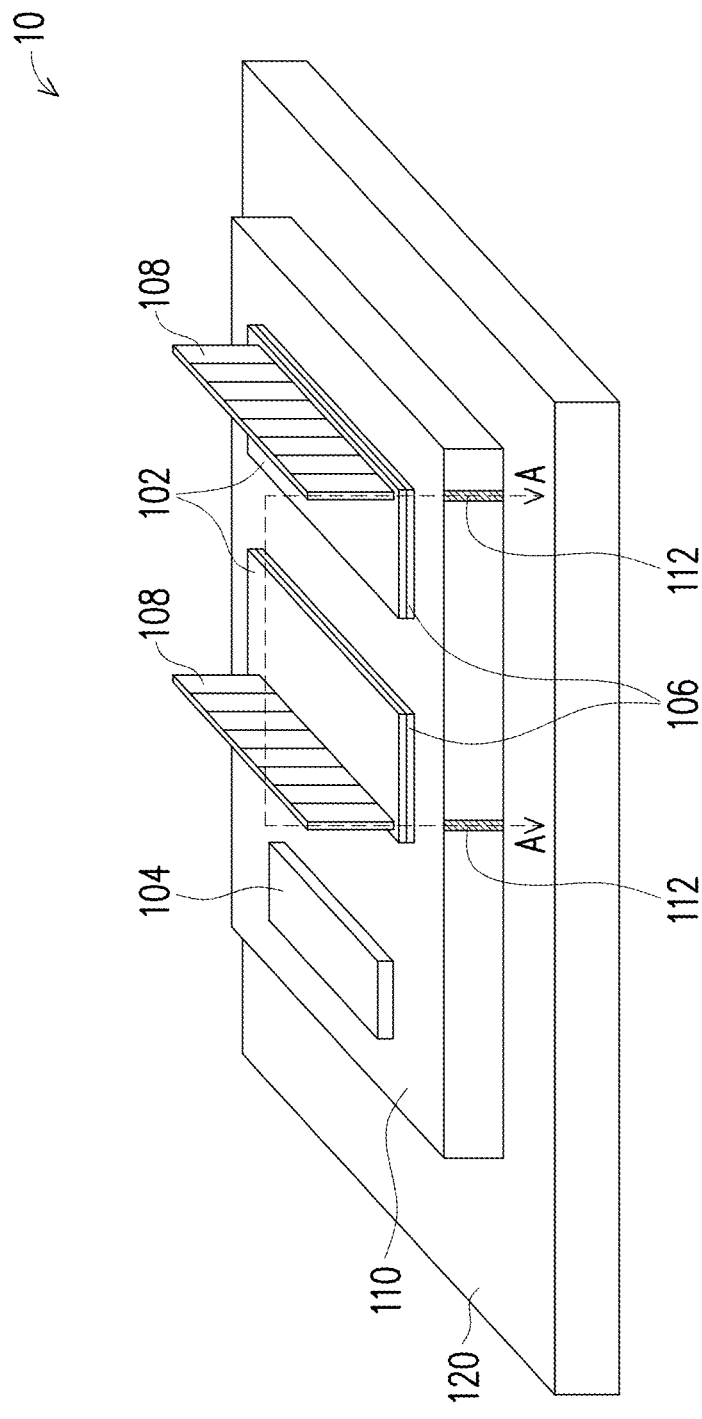
FIG. 1 is a schematic view showing a portion of a chip-on-wafer-on-substrate (CoWoS) package in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Other features and processes may also be included. For example, testing structures may be included to aid in the verification testing of the 3D packaging or 3DIC devices. The testing structures may include, for example, test pads formed in a redistribution layer or on a substrate that allows the testing of the 3D packaging or 3DIC, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies to increase the yield and decrease costs.

The coupling efficiency is the ratio of power that couples from the waveguide mode to the fiber mode (or vice versa) and can be calculated using $CE=(1-R)*\eta_d*\eta_{ov}$, wherein $\eta_d$ is the directionality, $\eta_{ov}$ is the optical field overlap, and R is the back reflection. Directionality $\eta_d$ measures a fraction of power that are diffracted upward. The optical field overlap $\eta_{ov}$ measures the overlap integral between the diffracted field profile and the Gaussian fiber mode, and the back reflection R measures a fraction of power reflected back into the input port. Therefore, in order to improve the coupling efficiency, one can improve the directionality, increase the overlap and use small refractive index contrast to reduce the back reflection.

A 3D packaging technology has been proposed in various stack structure, such as system-on-integrated-chip (SoIC) package, wafer-on-wafer (WoW) package, chip-on-wafer (CoW) package, and chip-on-wafer-on-substrate (CoWoS) package. For example, a package structure may include multiple photonic components to process, receive, and/or transmit optical signals. The package structure may be part of any suitable integrated circuit such as photonic integrated circuit (PIC), radio-frequency integrated circuit (RFIC), power integrated circuit (IC), analog IC, mixed-mode IC, and the like. In accordance with some embodiments of the present disclosure, the package structure may include photonic dies and an interposer structure, and the optical signals can be transmitted between the photonic components within the package at a higher data transmission rate through the interposer. The interposer structure includes a grating coupler having at least one grating region, and the photonic dies mounted on the interposer are optically coupled through the grating coupler of the interposer structure. The grating coupler(s) with a high coupling efficiency integrated within the interposer structure and the photonic dies can increase the data transmission rate between the photonic dies, which leads to better device performance. In addition, the grating coupler may be useful for wafer-scale testing. The integration of grating coupler(s) into the interposer of the package (s) is suitable for photonic device system applications and high-speed applications. Embodiments discussed herein are to provide examples to enable making or using the subject matter of this disclosure, and a person having ordinary skill in the art will readily understand modifications that can be made while remaining within contemplated scopes of different embodiments. Throughout the various views and illustrative embodiments, like reference numbers are used to designate like elements. Although method embodiments may be discussed as being performed in a particular order, other method embodiments may be performed in any logical order.

FIG. 1 illustrates an exemplary block diagram of a CoWoS package 10 in accordance with some embodiments. It is noted that the CoWoS package 10 is merely an example, and is not intended to limit the present disclosure. Accordingly, it is understood that additional functional blocks may be provided in or coupled to the CoWoS package 10 of FIG. 1, and that some other functional blocks may only be briefly described herein.

Referring to FIG. 1, the CoWoS package 10 comprises electronic dies 102, a light source die 104, photonic dies 106, an interposer structure 110 and a printed circuit board (PCB) substrate 120. The light source die 104 and the photonic dies 106 are coupled together through input/output interfaces (not shown) on the interposer structure 110. In some embodiments, the interposer structure 110 is fabricated using a semiconductor material (e.g. silicon oxide) and may be formed from a semiconductor substrate (e.g. bulk wafer). In some embodiments, the interposer structure 110 comprises at least one of the following: through substrate vias (TSVs) 112, a conductive feature, and a redistribution structure (not shown). In some embodiments, the interposer structure 110 is to integrate all components including the electronic dies 102, the light source die 104, and the photonic dies 106 together. In certain embodiments, each of the dies 104 and 106 are electrically connected to the interposer structure 110 using a flip-chip bonding method. In some embodiments, high density solder micro-bumps are used to connect the dies 104 and 106 to the interposer structure 110. Further, the interposer structure 110 is electrically connected to the PCB substrate 120 through TSVs 112 using controlled collapse chip connection (C4) bumps or ball grid array (BGA) bumps. The TSVs 112 can comprise electrically conductive paths that extend vertically through the interposer structure 110 and provide electrical connectivity between the photonic dies 106 and the PCB substrate 120. In some embodiments, the PCB substrate 120 can comprise a support structure for the CoWoS package 10, and can comprise both insulating and conductive material for isolation devices as well as providing electrical contact for active devices on the photonic dies 106 via the interposer structure 110. Further, the PCB substrate 120 can provide a thermally conductive path to carry away heat generated by devices and circuits in the light source die 104.

In some embodiments, the electronic dies 102 comprise integrated circuits (not shown) including amplifiers, control circuits, digital processing circuits, etc. The electronic dies 102 further comprise at least one electronic circuit (not shown) that provides the required electronic function of the CoWoS package 10 and driver circuits for controlling elements in the photonic dies 106.

In some embodiments, the light source die 104 comprises multiple components (not shown), such as at least one light emitting elements (e.g., a laser or a light-emitting diode), transmission elements, modulation elements, signal processing elements, switching circuits, amplifier, input/output coupler, and light sensing/detection circuits. In some embodiments, each of the at least one light-emitting elements in the light source die 104 can comprise solid-state inorganic, organic or a combination of inorganic/organic hybrid semiconducting materials to generate light. In some embodiments, the light source die 104 is on the photonic dies 106.

In some embodiments, the CoWoS package 10 further comprises optical fiber arrays 108 disposed on optical interfaces of the electronic dies 102. In some embodiments, the optical fiber arrays 108 comprises optical fibers and each of them can be a single-mode or a multi-mode optical fiber. In some embodiments, the optical fiber arrays 108 can be epoxied on the electronic dies 102.

In some embodiments, the photonic dies 106 further comprises components (not shown) such as a laser driver, digital control circuit, photodetectors, waveguides, small form-factor pluggable (SFP) transceiver, High-speed phase modulator (HSPM), calibration circuit, distributed Mach-Zehnder Interferometer (MZI), grating couplers, etc. The grating couplers enables the coupling of optical signals between the optical fiber arrays 108 and the light source die 104 or corresponding photodetectors on the photonic dies 106. In some embodiments, each of the grating couplers includes a grating region and a waveguide region with designs to reduce refractive index contrast to reduce back reflection losses providing improved coupling efficiency between the optical fiber on the corresponding grating region, which are discussed in details below in various embodiments of the present disclosure.

During operation, optical signals received from a remote server located at one end of the optical fiber arrays 108 may be coupled through the grating couplers to the corresponding photodetectors of the photonic dies 106. Alternatively, optical signals received from the light source die 104 can be coupled through the grating couplers to the optical fiber arrays 108 which can be further transmitted to the remote server.

Figure 2A:
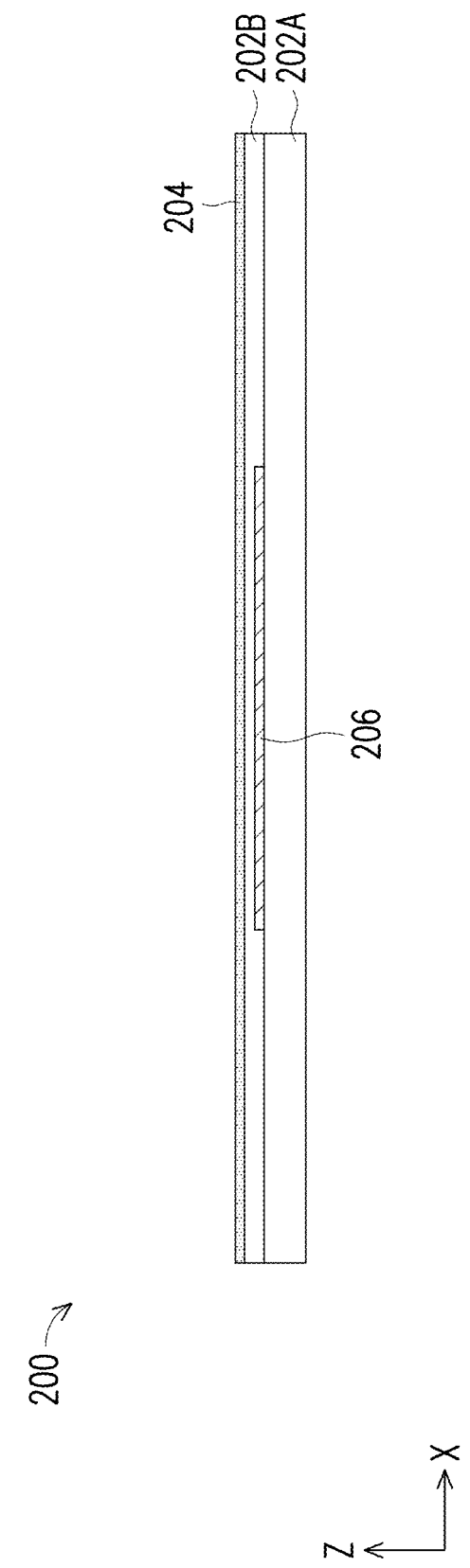
FIGS. 2A-2C are schematic cross-sectional views illustrating various stages of the process steps of a method for fabricating an interposer structure in accordance with some embodiments of the present disclosure.
Figure 2B:
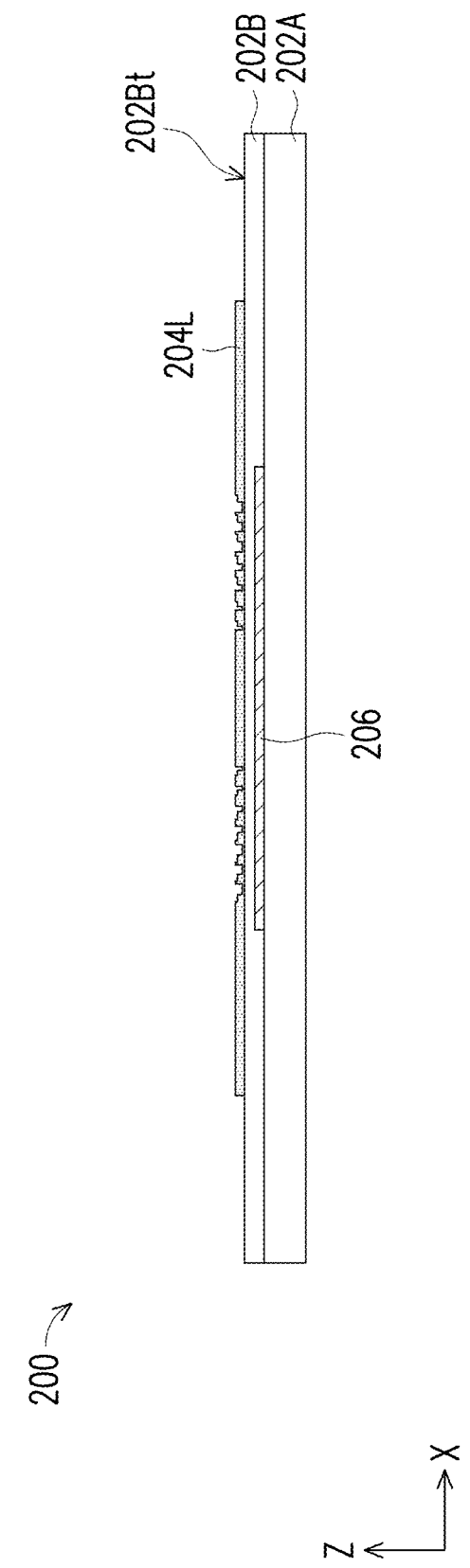
Figure 2C:
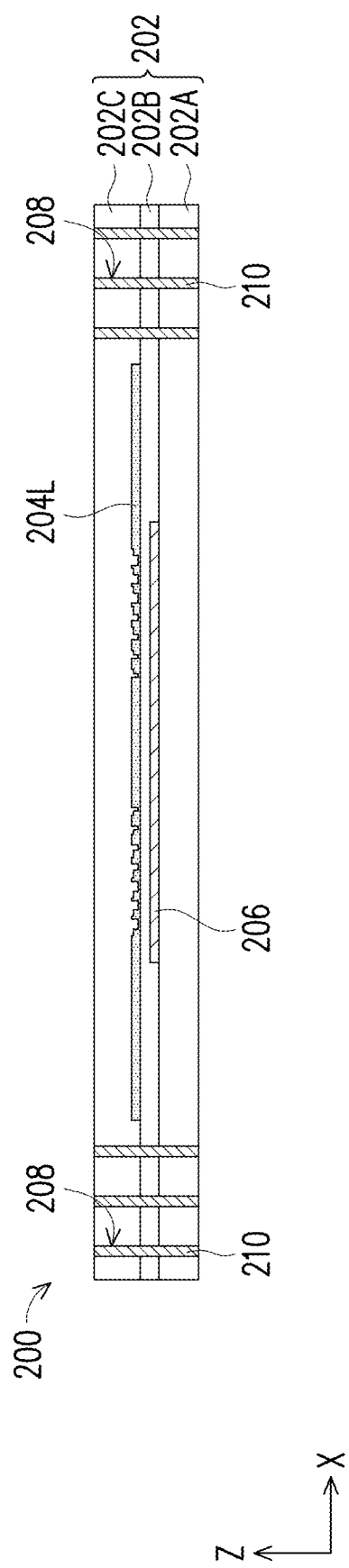
Figure 5:
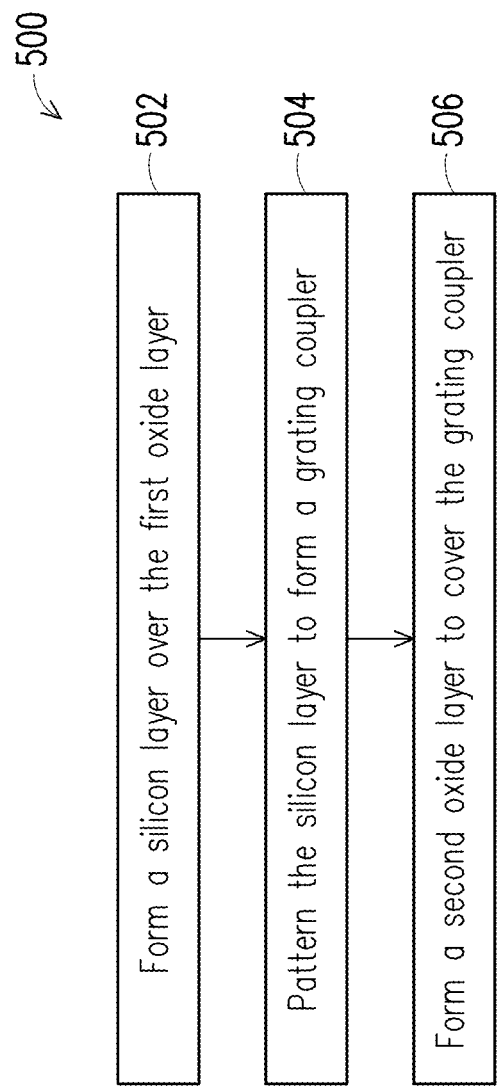
FIG. 5 is a flow chart illustrating a method for fabricating an interposer structure in accordance with some embodiments.

FIGS. 2A-2C are schematic cross-sectional views illustrating various stages of the process steps of a method for fabricating an interposer structure 200 in accordance with some embodiments of the present disclosure. The corresponding processes are also reflected schematically in the process flow 500 as shown in FIG. 5.

Referring to FIG. 2A, after forming a first oxide layer 202A, a reflector structure 206, and a second oxide layer 202B, a silicon layer 204 is disposed on the second oxide layer 202B. The respective process is illustrated as process 502 in the process flow 500 shown in FIG. 5. In some embodiments, processes to deposit the second oxide layer 202B on the reflector structure 206 on the first oxide layer 202A include thermal oxidation, spin coating, physical vapor deposition (PVD), chemical vapor deposition (CVD), etc. In some embodiments, the silicon layer 204 comprises polycrystalline silicon. In some embodiments, the doped-polycrystalline silicon can be deposited using a CVD process. In some embodiments, the silicon layer 204 has a thickness of about 200 nanometers. In some other embodiments, the silicon layer 204 has a thickness in a range of about 10 nanometers to about 1000 nanometers according to the application.

Referring to FIG. 2B, the silicon layer 204 is patterned to form the grating material layer 204L and exposed a top surface 202Bt of the second oxide layer 202B. The respective process is illustrated as process 504 in the process flow 500 shown in FIG. 5. In some embodiments, the silicon layer 204 is patterned through multi-etching techniques to form the grating material layer 204L having different trench pattern depths. For example, after forming a first hard mask (not shown) over the silicon layer 204, performing an etching process to the silicon layer 204 using the first hard mask as an etching mask to form the first trench pattern in the silicon layer 204. Further, use a second hard mask (not shown) to further etched the patterned silicon layer 204 using the second hard mask as an etching mask to form a step ("L"-shape) profile in the silicon layer 204.

Referring to FIG. 2C, after forming the grating material layer 204L, the third oxide layer 202C is formed over the second oxide layer 202B and covers the grating material layer 204L. The respective process is illustrated as process 506 in the process flow 500 shown in FIG. 5. Therefore, an oxide layer 202 including the first oxide layer 202A, the second oxide layer 202B, and the third oxide layer 202C (from bottom to top) is formed. The second oxide layer 202B is disposed between the first oxide layer 202A and the third oxide layer 202C. The grating material layer 204L and the reflector structure 206 are embedded within the oxide layer 202. In some embodiments, the reflector structure 206 is sandwiched between the first oxide layer 202A and the second oxide layer 202B, and the grating material layer 204L is sandwiched between the second oxide layer 202B and the third oxide layer 202C. In some embodiments, the reflector structure 206 is disposed below the grating material layer 204L. In some embodiments, a distance (Dm of FIG. 3B) between the reflector structure 206 and the grating material layer 204L is within a range of about 10 nanometers to about 10 micrometers. In one exemplary embodiment, the distance between the reflector structure 206 and the grating material layer 204L is greater than about 200 nanometers.

In some embodiments, a sum of the thickness of the first oxide layer 202A and that of the second oxide layer 202B is within a range of greater than 0 nanometer to about 100 micrometers. In one exemplary embodiment, the sum of the thickness of the first oxide layer 202A and that of the second oxide layer 202B is greater than about 6 micrometers. In some embodiments, the third oxide layer 202C has a thickness ranging from greater than 0 nanometer to about 100 micrometers. In one exemplary embodiment, the thickness of the third oxide layer 202C is greater than about 6 micrometers. It is understood that the number of the oxide layers may be more or less than three, and the thickness of the individual oxide layer(s) may be adjusted based on process requirements. In some embodiments, the material of the oxide layer 202 includes silicon oxide or polysilicon, and the material of the grating material layer 204L includes a semiconductor material such as silicon or other material with a suitable index such as silicon nitride.

In some embodiments, as seen in FIG. 2C, the TSVs 210 are formed in through holes 208 penetrating the oxide layer 202. In certain embodiments, the TSVs 210 may pass through the oxide layer 202 and extend towards a top surface of the third oxide layer 202C and a bottom surface of the first oxide layer 202A. Up to here, the interposer structure 200 in accordance with some embodiments of the present disclosure is obtained. In other embodiments, the silicon layer 204 is patterned without exposed the top surface 202Bt of the second oxide layer 202B, while the through holes 208 may also penetrate the grating material layer 204L. In certain embodiments, the TSVs 210 may pass through the oxide layer 202 and the grating material layer 204L.

Figure 3A:
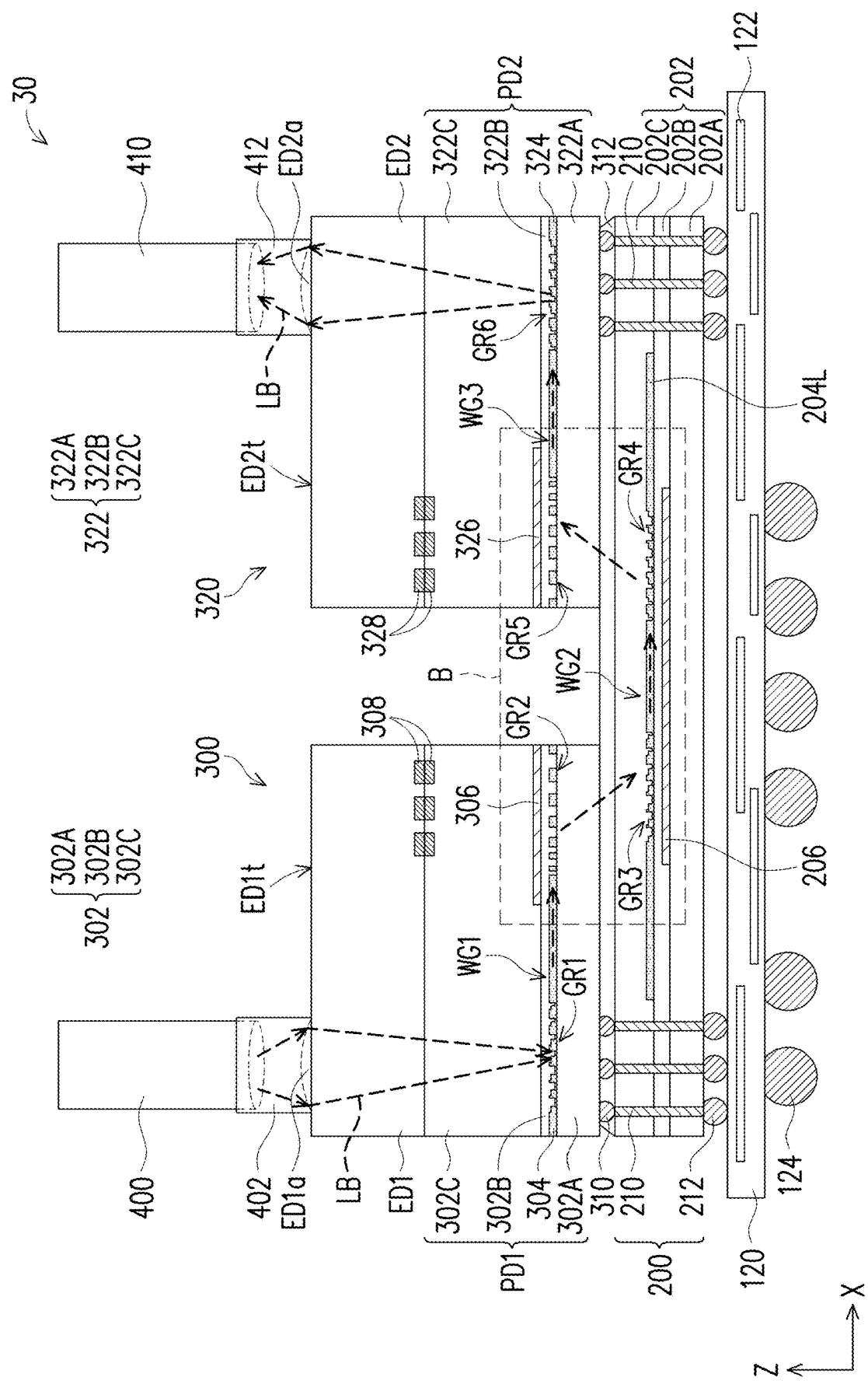
FIG. 3A illustrates a schematic cross-sectional view of a chip-on-wafer-on-substrate (CoWoS) package in accordance with some embodiments.
Figure 3B:
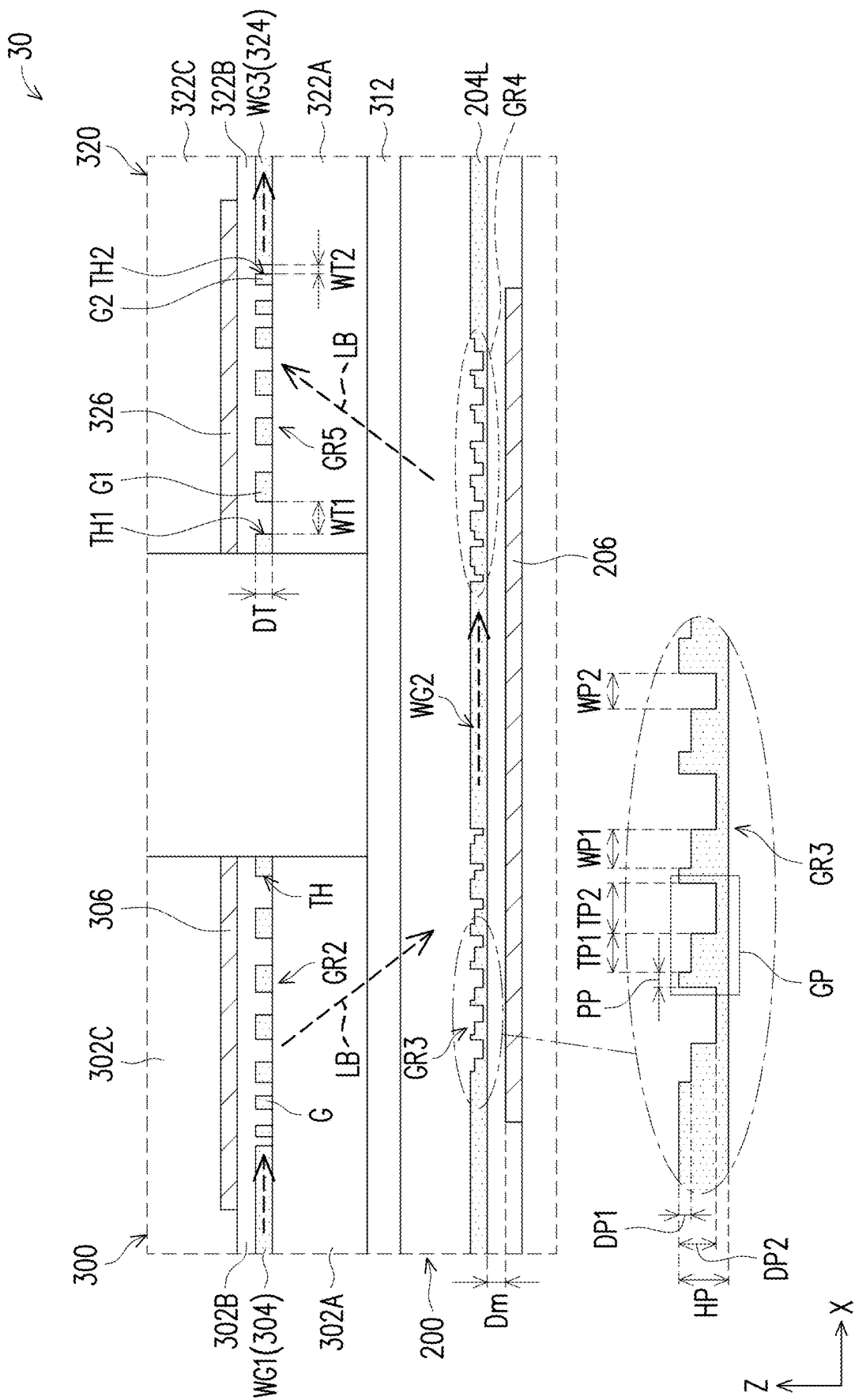
FIG. 3B is a partial enlargement view of FIG. 3A.

FIG. 3A illustrates a cross-sectional view of an exemplary CoWoS package 30. The schematic view of the CoWoS package 30 may be directed to a portion of the CoWoS package 10 of FIG. 1 along the line A-A. A schematic enlarged view of a portion (box B) of the CoWoS package 30 of FIG. 3A is shown in FIG. 3B in accordance with some embodiments.

Referring to FIG. 3A, the CoWoS package 30 comprises the PCB substrate 120, the interposer structure 200, a first package structure 300, a second package structure 320, and optical fibers 400 and 410. In some embodiments, the interposer structure 200 is disposed above the PCB substrate 120 and below the package structures 300 and 320.

In some embodiments, the first package structure 300 includes a photonic die PD1 and an electronic die ED1. For example, the electronic die ED1 is configured to process electrical signals, and the photonic die PD1 is configured to process optical signals. In some embodiments, electronic die ED1 and photonic die PD1 are formed within the same layered first package structure 300, thus resulting in an optoelectronic integrated chip.

In some embodiments, the photonic die PD1 includes a dielectric layer 302, a grating material layer 304, and a reflector structure 306. In some embodiments, in FIG. 3A, the grating material layer 304 and the reflector structure 306 are embedded in the dielectric layer 302. In some embodiments, the reflector structure 306 is disposed over and spaced apart from the grating material layer 304. In further embodiments, the dielectric layer 302 includes a first dielectric layer 302A, a second dielectric layer 302B, and a third dielectric layer 302C. The second dielectric layer 302B is disposed between the first dielectric layer 302A and the third dielectric layer 302C. In some embodiments, in FIG. 3A, the grating material layer 304 is embedded in and the reflector structure 306 is disposed on the second dielectric layer 302B. In some embodiments, a sum of the thickness of the second dielectric layer 302B and that of the third dielectric layer 302C is within a range of greater than 0 nanometer to about 100 micrometers. In one exemplary embodiment, the sum of the thickness of the second dielectric layer 302B and that of the third dielectric layer 302C is greater than about 8 micrometers. In some embodiments, a distance between the reflector structure 306 and the grating material layer 304 is within a range of about 10 nanometers to about 10 micrometers. In one embodiment, the distance between the reflector structure 306 and the grating material layer 304 is greater than about 200 nanometers.

In some embodiments, referring to FIG. 3A, the electronic die ED1 is disposed on the dielectric layer 302 and bonded to the photonic die PD1 through hybrid bonding. For example, the photonic die PD1 and electronic die ED1 respectively include bonding pads 308 disposed over the dielectric layer 302 and exposed at a surface of the dielectric layer 302. The bonding pads 308 of the electronic die ED1 are electrically connected and bonded to the bonding pads 308 of the photonic die PD1.

In some embodiments, referring to FIG. 3A, the second package structure 320 includes a photonic die PD2 and an electronic die ED2. Similar to the first package structure 300, the second package structure 320 may be an optoelectronic integrated chip. In some embodiments, the photonic die PD2 includes a dielectric layer 322, a grating material layer 324, and a reflector structure 326. In some embodiments, the second package structure 320 is adjacent to the first package structure 300. In some embodiments, in FIG. 3A, the grating material layer 324 and the reflector structure 326 are embedded in the dielectric layer 322. In some embodiments, the reflector structure 326 is disposed over and spaced apart from the grating material layer 324. In further embodiments, the dielectric layer 322 includes a first dielectric layer 322A, a second dielectric layer 322B, and a third dielectric layer 322C. The second dielectric layer 322B is disposed between the first dielectric layer 322A and the third dielectric layer 322C. In some embodiments, in FIG. 3A, the grating material layer 324 is embedded in and the reflector structure 326 is disposed on the second dielectric layer 322B. In some embodiments, a sum of the thickness of the second dielectric layer 322B and that of the third dielectric layer 322C is within a range of greater than 0 nanometer to about 100 micrometers. In one exemplary embodiment, the sum of the thickness of the second dielectric layer 322B and that of the third dielectric layer 322C is greater than about 8 micrometers. In some embodiments, a distance between the reflector structure 326 and the grating material layer 324 is within a range of about 10 nanometers to about 10 micrometers. In one embodiment, the distance between the reflector structure 326 and the grating material layer 324 is greater than about 200 nanometers.

In some embodiments, referring to FIG. 3A, the electronic die ED2 is disposed on the dielectric layer 322 and bonded to the photonic die PD2 through hybrid bonding. For example, the photonic die PD2 and electronic die ED2 respectively include bonding pads 328 disposed over the dielectric layer 322 and exposed at a surface of the dielectric layer 322. The bonding pads 328 of the electronic die ED2 are electrically connected and bonded to the bonding pads 328 of the photonic die PD2.

In some embodiments, materials of the dielectric layers 302 and 322 respectively are or comprise silicon oxide, a low k dielectric, or any combination of the foregoing. The low k dielectric may include fluorinated silica glass (FSG), phosphosilicate glass (PSG), borophosphosilicate glass (BPSG), carbon doped silicon oxide (SiOxCy), polyimide, and/or the like. In some embodiments, the first dielectric layers 302A and 322A respectively have a thickness ranging from greater than 0 nanometer to about 100 micrometers. In one exemplary embodiment, the thickness of the first dielectric layer 302A or 322A is greater than about 8 micrometers. In some embodiments, the materials of the grating material layers 304 and 324 respectively include a semiconductor material such as silicon or other material with a suitable index such as silicon nitride. The grating material layers 304 and 324 respectively have a thickness ranging from about 10 nanometers to 1000 nanometers. In one embodiment, the thickness of the grating material layer 304 or 324 is greater than about 200 nanometers. In some embodiments, the reflector structures 206, 306, and 326 respectively include at least one of the following: aluminum (Al), copper (Cu), nickel (Ni), ruthenium (Ru), manganese (Mn), titanium nitride (TiN), titanium (Ti), tantalum nitride (TaN), silicon nitride, combinations thereof, or the like.

In some embodiments, substrates of the electronic dies ED1 and ED2 are configured to be transparent to light radiation in a target wavelength range (herein, the target wavelength range is the wavelength range at which the package structure is configured to operate). For example, an exemplary target wavelength is in a range of about 1260 nanometers to about 1675 nanometers. It should be noted that for package structures that require the transmission of light in a different wavelength range (e.g., about 1260 nanometers to about 1360 nanometers or about 1530 nanometers to about 1565 nanometers), a different substrate may be used. For instance, substrate materials of the electronic dies ED1 and ED2 respectively are silicon or silicon nitride.

In some embodiments, the electronic dies ED1 and ED2 respectively have a thickness being greater than about 300 micrometers. In one embodiment, the thickness of the electronic die ED1 or ED2 is within a range of about 300 micrometers to greater than about 1000 micrometers.

In some embodiments, referring to FIG. 3A, the first package structure 300 includes a lens ED1a disposed within the electronic die ED1 and being adjacent to a top surface ED1t of the electronic die ED1. In one embodiment, the lens ED1a is a protruded portion of the electronic die ED1 protruded above the top surface ED1t. In some embodiments, the lens ED1a is overlapped with a portion of the grating material layer 304. In some embodiments, the second package structure 320 includes a lens ED2a disposed within the electronic die ED2 and being adjacent to a top surface ED2t of the electronic die ED2. In one embodiment, the lens ED2a is a protruded portion of the electronic die ED2 protruded above the top surface ED2t. In some embodiments, the lens ED2a is overlapped with a portion of the grating material layer 324.

In some embodiments, referring to FIG. 3A, optical fibers 400 and 410 respectively are disposed over the package structures 300 and 320. The optical fiber 400 is disposed over the electronic die ED1, and a location of the optical fiber 400 is vertically overlapped with a location of the lens ED1a. The optical fiber 410 is disposed over the electronic die ED2, and a location of the optical fiber 410 is vertically overlapped with a location of the lens ED2a. For example, the location of the optical fibers 400 and 410 respectively are vertically overlapped with a location of the grating material layers 304 and 324, and a fiber tilt angle of the optical fiber 400 or 410 relative to a plane perpendicular to the grating material layer 304 or 324 is within a range of about 5 degrees to about 15 degrees. In one exemplary embodiment, the fiber tilt angle of the optical fiber 400 or 410 is about 12 degrees. By controlling the fiber tilt angle of the optical fiber 400 or 410 in such a range, a coupling efficiency may be improved.

In some embodiments, the optical fiber 400 and the lens ED1a are optically connected by a light transparent material (e.g., an optical gel 402) that serves as a light bridge across a gap between the optical fiber 400 and the electronic die ED1. The optical fiber 410 and the lens ED2a are optically connected by a light transparent material (e.g., an optical gel 412) that serves as a light bridge across a gap between the optical fiber 410 and the electronic die ED2. In some embodiments, the optical gels 402 and 412 respectively are index matched to the optical fibers 400 and 410.

In some embodiments, the package structures 300 and 320 are optically coupled through the grating material layers 304 and 324 and the grating material layer 204L of the interposer structure 200. In further embodiments, the light beam LB emitted from the optical fiber 400 is focused by the lens ED1a onto the grating material layer 304. The package structures 300 and 320 are optically coupled through the light beam LB waveguided between the grating material layers 304, 204L, and 324. The light beam LB transmitted and emitted from the grating material layer 324 is focused by the lens ED2a to the optical fiber 410.

Referring to FIG. 3A and FIG. 3B, the grating material layer 304 of the first package structure 300 includes grating regions GR1 and GR2 and a waveguide region WG1 being adjacent to the grating regions GR1 and GR2. The grating material layer 204L of the interposer structure 200 includes grating regions GR3 and GR4 and a waveguide region WG2 being adjacent to the grating regions GR3 and GR4. The grating material layer 324 of the second package structure 320 includes grating regions GR5 and GR6 and a waveguide region WG3 being adjacent to the grating regions GR5 and GR6. In some embodiments, the light beam LB is waveguided through the following optically-coupled paths. In the grating material layer 304, the light beam LB from the optical fiber 400 is received by the grating region GR1, waveguided by the waveguide region WG1, and emitted towards the interposer structure 200 by the grating region GR2. In the grating material layer 204L, the light beam LB is received by the grating region GR3, waveguided by the waveguide region WG2, and emitted towards the second package structure 320 by the grating region GR4. In the grating material layer 324, the light beam LB is received by the grating region GR5, waveguided by the waveguide region WG3, and emitted towards the optical fiber 410 by the grating region GR6.

In some embodiments, the grating regions GR1, GR3, GR4, and GR6 respectively include periodic grating patterns GP for enhancing coupling efficiency. Any numbers of grating patterns GP in the grating material layer 304, 204L, or 324 can be used and are within the scope of the present disclosure. In some embodiments, each grating pattern GP has a L-shaped sidewall profile that are fabricated through at least two etching steps for achieving low back-reflection and high directionality. In some embodiments, the grating pattern GP has a first trench pattern TP1, a second trench pattern TP2, and a pillar pattern PP. The first trench pattern TP1 is located between the second trench pattern TP2 and the pillar pattern PP. The first trench pattern TP1 has a first depth DP1, while the second trench pattern TP2 has a second depth DP2, and the first depth DP1 is less than the second depth DP2. In one embodiment, the second depth DP2 of the second trench pattern TP2 is less than a height HP of the pillar pattern PP, wherein the height HP is substantially equal to the thickness of the grating material layer 304, 204L, or 324, thus the second trench pattern TP2 is not penetrating through the grating material layer 304, 204L, or 324. In some embodiments, the first trench pattern TP1 has a first width WP1, while the second trench pattern TP2 has a second width WP2. In one embodiment, the first width WP1 is different from the second width WP2. For example, the first width WP1 is greater than the second width WP2.

In some embodiments, in the periodic grating patterns GP, one first trench pattern TP1 has a first width WP1 different from that of another first trench pattern TP1, and one second trench pattern TP2 has a second width WP2 different from that of another second trench pattern TP2. In one embodiment, in the grating regions GR1 and GR3, the second widths WP2 of the second trench patterns TP2 are gradually decreased along the X-direction (a waveguiding direction of light beam LB). In addition, in the grating regions GR4 and GR6, the second widths WP2 of the second trench patterns TP2 are gradually increased along the X-direction. In some embodiments, at least two first trench patterns TP1 have a same first width WP1, and at least two second trench patterns TP2 have a same second width WP2.

In some embodiments, the grating regions GR2 and GR5 respectively include through holes TH and gratings G defined between the through holes TH. Any numbers of through holes TH in the grating material layer 304 or 324 can be used and are within the scope of the present disclosure. In some embodiments, the through holes TH are spaced apart and laterally separated with one another along the X-direction. In further embodiments, the through holes TH have a same depth DT. In one embodiment, the depth DT of the through holes TH is substantially equal to the thickness of the grating material layer 304 or 324, thus the through holes TH penetrate the grating material layer 304 or 324. In some embodiments, the through holes TH have different widths. For example, one through hole TH1 of the through holes TH has a width WT1 different from a width WT2 of another through hole TH2 of the through holes TH. In some embodiments, one grating G1 of the gratings G has a width different from that of another grating G2 of the gratings G. As seen in FIG. 3B, the width WT1 of the through hole TH1 is greater than the width WT2 of the through hole TH2. In some embodiments, the width WT2 of the through hole TH2 is within a range of about 0 nanometer to about 200 nanometers. In one exemplary embodiment, the width WT2 of the through hole TH2 is greater than about 60 nanometers. In some embodiments, the width of the grating G2 is within a range of about 0 nanometer to about 1000 nanometers. In one exemplary embodiment, the width of the grating G2 is greater than about 400 nanometers. In some embodiments, the widths of the through holes TH of the grating region GR2 are gradually increased along the X-direction, and the widths of the through holes TH of the grating region GR5 are gradually decreased along the X-direction.

In some embodiments, as seen in FIG. 3A, the lens ED1a is overlapped with and focuses the light beam LB on the grating region GR1, and the lens ED2a is overlapped with and receives the light beam LB from the grating region GR6. In one embodiment, the collimated light beam LB from the external source (e.g., the optical fiber 400) with the correct diameter, which is launched onto the lens ED1a, can be focused into an about 9.2 micrometers spot on the grating region GR1. By disposing the lens ED1a or ED2a, a lateral alignment tolerance may be increased, and a light beam loss may be reduced. In some embodiments, the reflector structure 306 is disposed above and overlapped with the grating region GR2. The reflector structure 326 is disposed above and overlapped with the grating region GR5. The reflector structure 206 is disposed below and overlapped with the grating regions GR3 and GR4 and the waveguide region WG2. By disposing the reflector structure 206, 306, or 326, leaked optic energy can be reflected and re-collected and coupling loss can be reduced, thus further enhancing the coupling efficiency and the light efficiency of the grating material layer 204L, 304, or 324.

With continuing reference to FIG. 3A, the package structures 300 and 320 are electrically connected with the interposer structure 200 through bump connectors 310, and may be further electrically connected with the PCB substrate 120. In some embodiments, the bump connectors 310 include micro-bumps, metal posts or combinations thereof. In some embodiments, an underfill structure 312 is formed on the interposer structure 200 to cover and surround the bump connectors 310. In other words, the underfill structure 312 fills into a space located between the package structures 300 and 320 and the interposer structure 200. In some embodiments, the interposer structure 200 overlies and is electrically connected with the PCB substrate 120 through bump connectors 212, and the above package structures 300 and 320 are electrically connected with the PCB substrate 120 through the bump connectors 310, the TSVs 210 of the interposer structure 200 and the bump connectors 212. It is understood that the interposer structure 200 may further include routing traces (not shown). In some embodiments, the bump connectors 212 include controlled collapse chip connection (C4) bumps or ball grid array (BGA) bumps. In some embodiments, the PCB substrate 120 further comprises conductive traces 122 to provide electrical connection paths for connecting the above package structures 300 and 320 to outer electronic devices through the solder balls 124.

Figure 4A:
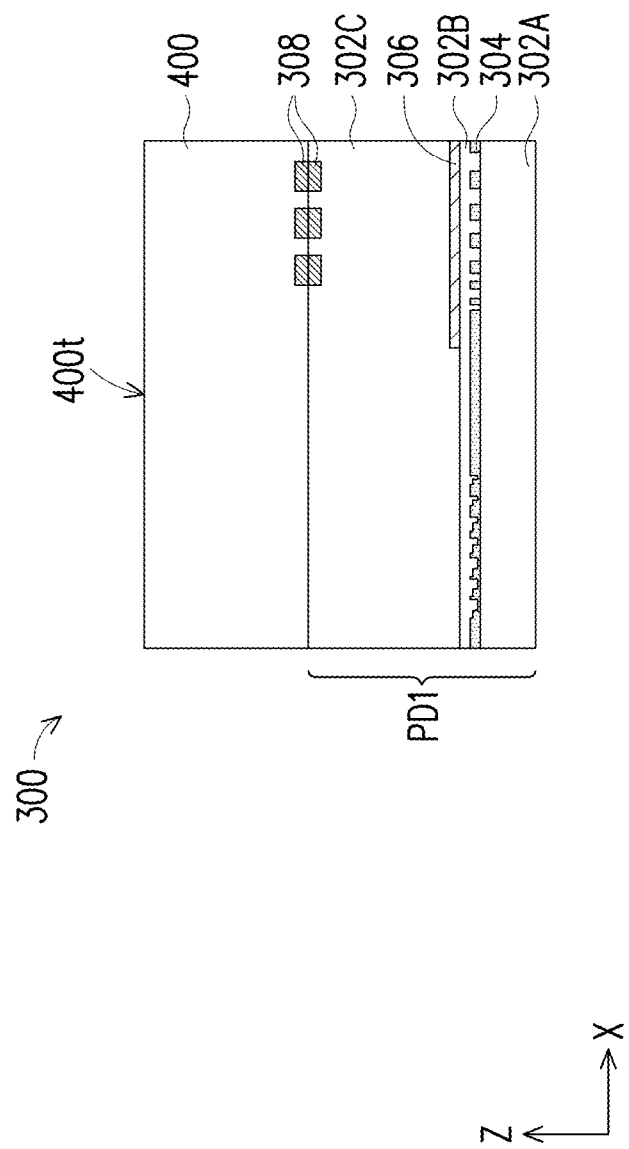
FIGS. 4A-4C are schematic cross-sectional views illustrating various stages of the process steps of a method for fabricating a package structure in accordance with some embodiments of the present disclosure.
Figure 4B:
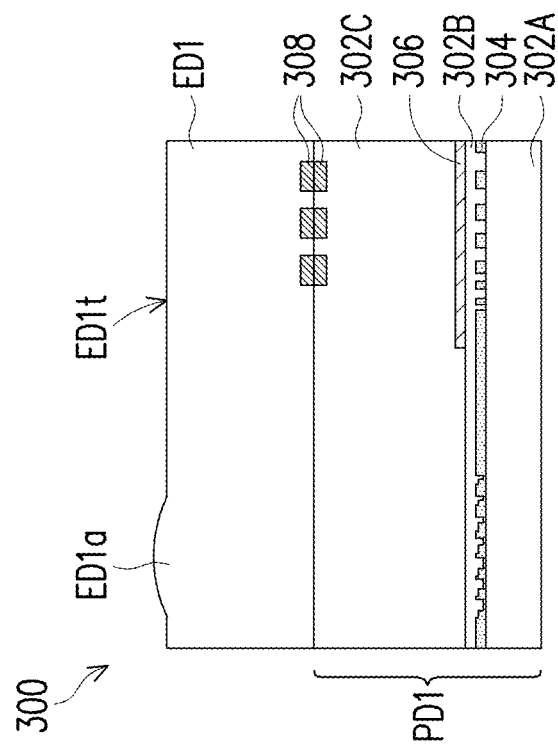
Figure 4C:
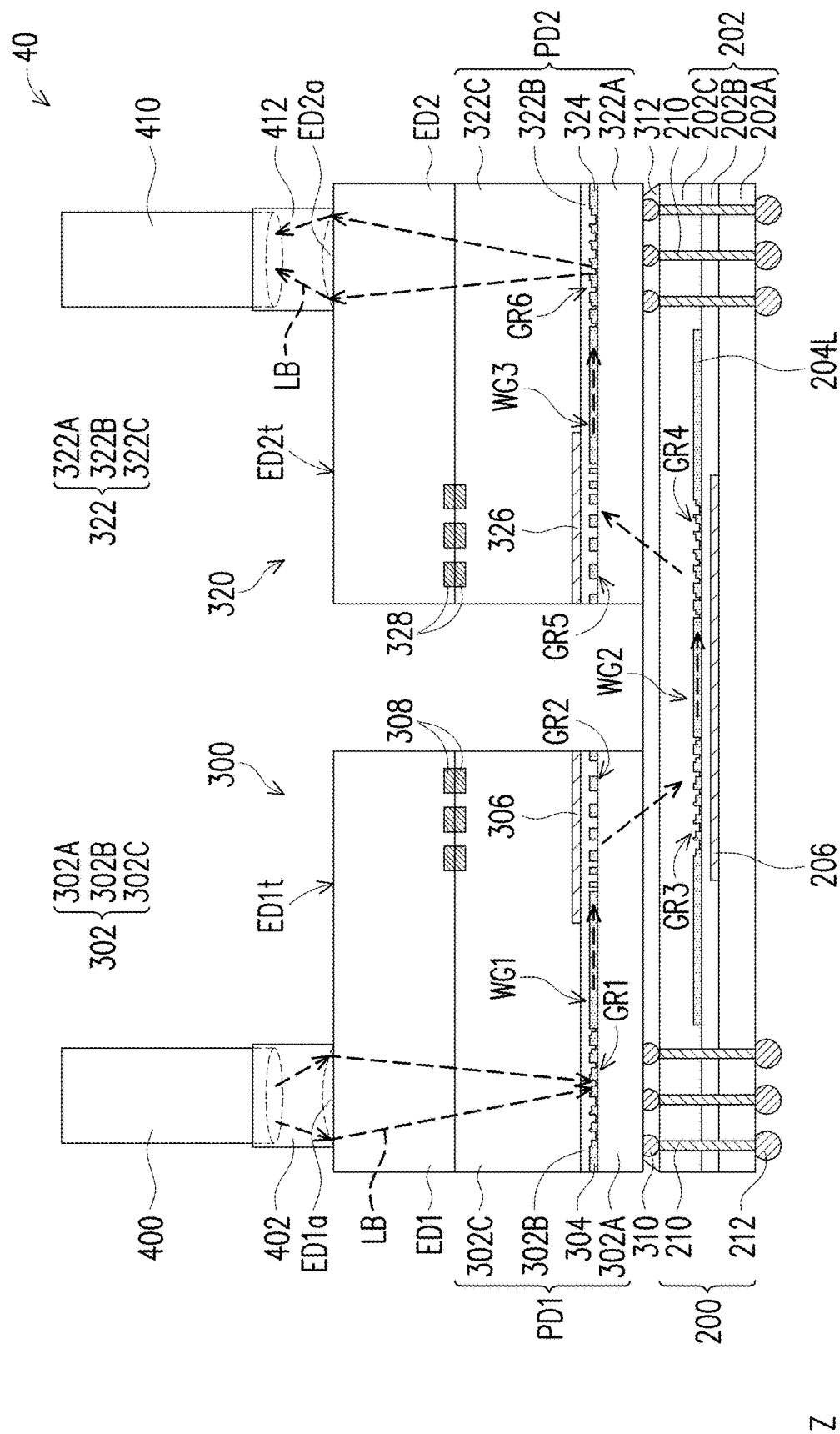
Figure 6:
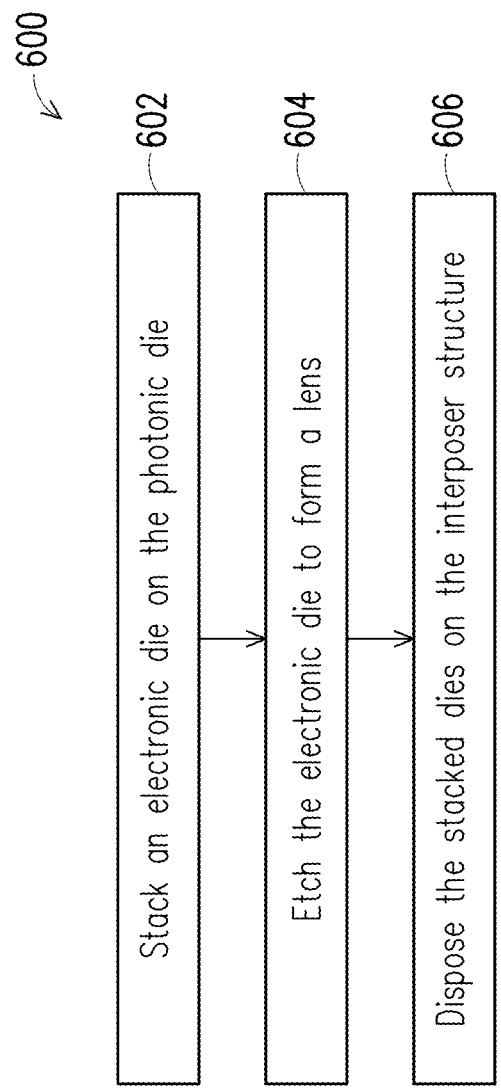
FIG. 6 is a flow chart illustrating a method for fabricating a package structure in accordance with some embodiments.

FIGS. 4A-4B are schematic cross-sectional views illustrating various stages of the process steps of a method for fabricating the first package structure 300 in accordance with some embodiments of the present disclosure. FIG. 4C illustrates a schematic cross-sectional view of a package structure 40 in accordance with some embodiments. The corresponding processes are also reflected schematically in the process flow 600 as shown in FIG. 6.

Referring to FIG. 4A, after providing the photonic die PD1 having the grating material layer 304, an electronic die 400 is stacked on the photonic die PD1. The respective process is illustrated as process 602 in the process flow 600 shown in FIG. 6. In some embodiments, the electronic die 400 is disposed on and bonded to the photonic die PD1 through hybrid bonding. In one embodiment, the electronic die 400 is electrically connected and bonded to the photonic die PD1 through the bonding pads 308.

Referring to FIG. 4B, perform an etching process to a top surface 400t of the electronic die 400 to form the lens ED1a protruded above the top surface ED1t of the electronic die ED1. The respective process is illustrated as process 604 in the process flow 600 shown in FIG. 6. Up to here, the first package structure 300 (stacked die package or semiconductor device) in accordance with some embodiments of the present disclosure is obtained. Similarly, the second package structure 320 having the grating material layer 324 may be fabricated in the same way, however the disclosure is not limited thereto. In some embodiments, a material of the lens ED1a is or comprises silicon or silicon nitride.

Referring to FIG. 4C, the package structures 300 and 320 (the stacked die packages) are further disposed on and optically coupled to the interposer structure 200 to obtain a package structure 40 (or semiconductor device). The respective process is illustrated as process 606 in the process flow 600 shown in FIG. 6. In some embodiments, the optical fiber 400 is disposed on the electronic die ED1, and the optical fiber 410 is disposed on the electronic die ED2. In one embodiment, the optical fiber 400 and the lens ED1a are optically connected by the optical gel 402, and the optical fiber 410 and the lens ED2a are optically connected by the optical gel 412. In the package structure 40, since the package structures 300 and 320 are optically coupled through the grating material layers 304 and 324 and the grating material layer 204L of the interposer structure 200, the data transmission rate between the package structures 300 and 320 can be increased, leading to better device performance.

A package structure having a grating coupler and a manufacturing method thereof are provided. The embodiments of the present disclosure have some advantageous features. In accordance with some embodiments of the present disclosure, the package structure may include photonic dies and an interposer structure, and the optical signals can be transmitted between the photonic components within the package at a higher data transmission rate through the interposer. The interposer structure includes a grating coupler having at least one grating region, and the photonic dies mounted on the interposer are optically coupled through the grating coupler of the interposer structure. The grating coupler(s) with a high coupling efficiency integrated within the interposer structure and the photonic dies can increase the data transmission rate between the photonic dies, which leads to better device performance. In addition, the grating coupler may be useful for wafer-scale testing. The integration of grating coupler(s) into the interposer of the package(s) is suitable for photonic device system applications and high-speed applications.

In accordance with some embodiments of the present disclosure, a package structure comprises photonic dies and an interposer structure. Each photonic die includes a dielectric layer and a first grating coupler embedded in the dielectric layer. The interposer structure is disposed below the photonic dies. The interposer structure includes an oxide layer and a second grating coupler embedded in the oxide layer. The photonic dies are optically coupled through the first grating couplers of the photonic dies and the second grating coupler of the interposer structure.

In accordance with some embodiments of the present disclosure, a package structure comprises a first photonic die, a second photonic die, and an interposer structure. The first photonic die includes a first grating coupler configured to receive and transmit a light beam. The second photonic die is disposed beside and adjacent to the first photonic die and includes a second grating coupler configured to transmit and emit the light beam. The interposer structure is disposed below the first and second photonic dies and includes a third grating coupler configured to waveguide the light beam. The first and second photonic dies are optically coupled through the light beam waveguided between the first, third, and second grating couplers.

In accordance with some embodiments of the present disclosure, a method for manufacturing a package structure is described. The method includes the following steps. An interposer structure is provided, wherein the interposer structure is provided with a first oxide layer, a first grating coupler on the first oxide layer, and a second oxide layer over the first oxide layer and covering the first grating coupler. A first photonic die is disposed, wherein the first photonic die includes a second grating coupler on the second oxide layer. A second photonic die is disposed, wherein the second photonic die includes a third grating coupler on the second oxide layer. The first and second photonic dies are optically coupled through the first grating coupler of the interposer structure and the second and third grating couplers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A package structure, comprising:
   photonic dies, wherein each photonic die includes a first grating material layer, and the first grating material layer includes a first grating coupler;
   lenses respectively disposed above the first grating couplers of the photonic dies; and
   an interposer structure, disposed below the photonic dies, wherein the interposer structure includes a second grating material layer, and the second grating material layer includes a second grating coupler,
   wherein the photonic dies are optically coupled through the first grating couplers of the photonic dies and the second grating coupler of the interposer structure.

2. The package structure according to claim 1, wherein each photonic die further includes a first reflector structure above the first grating coupler, and
the interposer structure further includes a second reflector structure below the second grating coupler, and
the first and second grating couplers are located between the first and second reflector structures.

3. The package structure according to claim 1, further comprising electronic dies respectively bonded with the photonic dies, wherein each electronic die includes at least one lens.

4. The package structure according to claim 1, wherein the first grating coupler includes a first grating region below the lens, and the second grating coupler includes a second grating region, the first grating region includes a first trench pattern and a second trench pattern different from the first trench pattern, and the second grating region includes a third trench pattern and a fourth trench pattern different from the third trench pattern.

5. The package structure according to claim 4, wherein the first grating coupler further includes a third grating region located beside and spaced apart from the first grating region, and the third grating region includes through holes penetrating through the first grating material layer.

6. The package structure according to claim 5, wherein the first grating coupler includes a first waveguide region located between the first and third grating regions.

7. The package structure according to claim 1, wherein the first grating material layer includes silicon, and the second grating material layer includes silicon.

8. The package structure according to claim 1, wherein the interposer structure further includes conductive through vias penetrating through the second grating material layer and penetrating through the interposer structure.

9. A package structure, comprising:
a first photonic die including a first grating material layer with a first grating coupler configured to receive and transmit a light beam;
a second photonic die, disposed beside and adjacent to the first photonic die and including a second grating material layer with a second grating coupler configured to transmit and emit the light beam;
a first electronic die disposed over the first photonic die, wherein the first electronic die includes a first lens;
a second electronic die disposed over the second photonic die, wherein the second electronic die includes a second lens; and
an interposer structure, disposed below the first and second photonic dies and including a third grating material layer with a third grating coupler configured to waveguide the light beam,
wherein the first and second photonic dies are optically coupled through the light beam waveguided between the first, third, and second grating couplers.

10. The package structure according to claim 9, further comprising:
a first optical fiber disposed over the first electronic die, wherein a location of the first optical fiber is overlapped with a location of the first lens; and
a second optical fiber disposed over the second electronic die, wherein a location of the second optical fiber is overlapped with a location of the second lens,
wherein the light beam emitted from the first optical fiber is focused by the first lens onto the first grating coupler, and the light beam transmitted and emitted from the second grating coupler is focused by the second lens to the second optical fiber.

11. The package structure according to claim 10, wherein a fiber tilt angle of the first optical fiber relative to a plane perpendicular to the first grating material layer is within a range of about 5 degrees to about 15 degrees, and a fiber tilt angle of the second optical fiber relative to a plane perpendicular to the second grating material layer is within a range of about 5 degrees to about 15 degrees.

12. The package structure according to claim 9, wherein the interposer structure further includes a reflector structure disposed below the third grating coupler and a location of the reflector structure is overlapped with a location of the third grating coupler.

13. The package structure according to claim 12, wherein the third grating coupler includes a first grating region configured to waveguide the light beam, the first grating region includes a first trench pattern with a first depth and a second trench pattern with a second depth, and the first depth of the first trench pattern is less than the second depth of the second trench pattern.

14. The package structure according to claim 13, wherein the first grating coupler includes a second grating region, a third grating region and a first waveguide region located between the second and third grating regions.

15. The package structure according to claim 14, wherein the second grating coupler includes a fourth grating region, a fifth grating region and a second waveguide region located between the fourth and fifth grating regions.

16. The package structure according to claim 9, wherein the interposer structure further includes conductive through vias penetrating through the third grating material layer and penetrating through the interposer structure.

17. A manufacturing method of a package structure, comprising:
providing a first photonic die including a first grating material layer with a first grating coupler, and a first electronic die including a first lens disposed over and bonded with the first photonic die;
providing a second photonic die including a second grating material layer with a second grating coupler, and a second electronic die including a second lens disposed over and bonded with the second photonic die;
providing an interposer structure including a third grating material layer with a third grating coupler; and
connecting the first photonic die and the first electronic die, and the second photonic die and the second electronic die to the interposer structure,
wherein the first and second photonic dies are optically coupled through the third grating coupler of the interposer structure and the first and second grating couplers.

18. The method according to claim 17, wherein the first electronic die including the first lens is provided by etching a portion of the first electronic die to form the first lens, and the second electronic die including the second lens is provided by etching a portion of the second electronic die to form the second lens.

19. The method according to claim 18, further comprising:
disposing a first optical fiber over the first lens, and disposing a second optical fiber over the second lens.

20. The method according to claim 19, wherein a fiber tilt angle of the first optical fiber relative to a plane perpendicular to the first grating material layer is within a range of about 5 degrees to about 15 degrees, and a fiber tilt angle of the second optical fiber relative to a plane perpendicular to the second grating material layer is within a range of about 5 degrees to about 15 degrees.

* * * * *